United States Patent Office 3,158,550
Patented Nov. 24, 1964

3,158,550
FERMENTATION PROCESS FOR PRODUCING GLYCEROL
Herman Schwarcz, Bronx, N.Y., assignor of eighty-six percent to Tibor T. Polgar, Bronx, N.Y., seven percent to Nathaniel H. Brower, New York, N.Y., and seven percent to Irving Seidman, New York, N.Y.
No Drawing. Filed Apr. 3, 1962, Ser. No. 184,668
2 Claims. (Cl. 195—38)

This invention relates to a process of fermenting starch or sugar containing materials including corn and other grains for the production of glycerol, alcohol and acetaldehyde.

While the normal fermentation of grains yields as a major product, alcohol; it has been proposed to modify the fermentation procedures to increase the yield of glycerol, and correspondingly reduce the amount of alcohol produced. This is accomplished by fermenting the grain in the presence of chemicals which will hold the pH values to a range of about 6.0 to 8.0. Commonly, the chemicals used are sodium bisulfite or sulfite; or sodium carbonate, sodium hydroxide or potassium carbonate.

However, the usual procedures based on sodium bisulfite have some disadvantages in that sulfur dioxide is released during fermentation and this has an adverse effect on the process, particularly in that the gas kills the fermenting microorganisms.

In the bisulfite process, there are present quantities of both the sulfite and bisulfite in approximately equal amounts. During the reactions involved, sulfite is converted to bisulfite and accordingly, additional bisulfite does not have to be added. However, a major advantage of the bisulfite process is that the amount of sulfite used may be limited at the commencement of the fermentation and smaller quantities of bisulfite are subsequently added, as required. The use of small quantities of bisulfite at intervals, shortens the fermentation period and increases the glycerol yield.

When using alkali salts, such as carbonates or the like, the additive chemicals are present in accordance with the concentration and temperature values of the sugar in the mash. Also, during fermentation, the reactions must be carefully controlled, to avoid a decrease in glycerol yield. After the fermentation commences, carbonate solutions are added to the fermenting mash to raise the pH to 6.0–8.0.

The primary purpose of the additive chemicals used in the process herein, is to prevent conversion of the acetaldehyde to alcohol, thus allowing the usual enzyme or acid cook procedures to focus on the glycerol-acetaldehyde reactions. The ratio of alcohol and acetaldehyde produced in the process may be varied by suitable variations in the fermentation procedure. Also, the glycerol yield can be increased by providing a higher mash concentration and the use of selected high quality yeasts.

The fermentation of the saccharified mash involves the following equations:

$$C_6H_{12}O_6 \rightarrow 2C_2H_5OH + 2CO_2$$

Thus a single molecule of glucose is converted into two molecules of ethyl alcohol.

Also, glucose is convertible into acetaldehyde and glycerol in accordance with the following reactions:

$$C_6H_{12}O_6 \rightarrow 2CH_3COCH(OH)_2$$

One of the resultant molecules of methylglyoxial is converted into pyruvic acid:

$$CH_3COCH(OH)_2 \rightarrow CH_3COCOOH + H_2$$

the pyruvic acid in turn forming acetaldehyde:

$$CH_3COCOOH \rightarrow CH_3CHO + CO_2$$

The free hydrogen derived from the methylglyoxal does not combine with the acetaldehyde to form alcohol. Instead, such hydrogen combines with the second molecule of methylglyoxal to form glycerol:

$$CH_3COCH(OH)_2 + H_2 \rightarrow C_3H_5(OH)_3$$

Glycerol is also formed from glucose as follows:

$$C_6H_{12}O_6 \rightarrow C_3H_5(OH)_3 + CH_3CHO + CO_2$$

The acetaldehyde is convertible into alcohol, and the extent of such conversion depends on the amount of sulfites, carbonates, etc. present. Under favorable conditions, the acetaldehyde is converted into alcohol as follows:

$$2CH_3CHO + H_2O \rightarrow C_2H_5OH + CH_3COOH$$

If bisulfite is present, the acetic acid reacts therewith:

$$CH_3COOH + NaHSO_3 \rightarrow NaCH_3COO + H_2O + SO_2$$

Thus, the glycerol is derived from the glucose by way of the methylglyoxal-pyruvic acid conversion, as noted above and the acetaldehyde will not combine with the free hydrogen to form ethyl alcohol, as indicated above.

Of course, alcohol will be produced from acetaldehyde derived from the first molecule of methylglyoxal, as described above.

An object of this invention is to provide an improved saccharified mash fermentation process wherein the proportion of glycerol produced is increased.

Another object of this invention is to provide an improved fermentation process for saccharified mash wherein the yeast system includes a combination of acids at predetermined concentrations to optimize the growth and activity of microorganisms which tend to increase the ultimate yield of glycerol.

In accordance with the instant invention, the selected grain, such as corn, is ground to flour, the oil content having been previously extracted. The flour is then cooked under pressure by either the use of enzymes produced by the usual malting procedure applied after the cooking, or by cooking the flour in the presence of an acid medium.

After cooking and saccharification, the resultant mash is filtered and the heavy solids separated from the liquid which contains fine particles of protein. The fermentation mash is now in the liquid portion. The heavy solids thus obtained, with later treatment form a dried slop having valuable protein content and is used as an animal feed.

The remaining liquid is fermented in fermenters for from two to four days, giving a high concentration mash. After fermentation is completed, such concentration must be reduced to prepare the same for refermentation. At this time, a yeast strain of fermenting organisms is developed which will adequately cope with high concentration mashes.

To this end, a small quantity of grain mash, drawn from the cooked mash, is kept at a temperature of about 68° C. until the natural lactic acid content thereof reaches a concentration of about 0.6–0.9 N. The mash is then cooled to about 25° C. Sulfuric acid of a concentration of about 0.3–0.7 N is added and the combined acid concentrations is held to from 0.9 to 1.6 N. The necessary yeast is added to the thus acidified mash and is fermented until 66 to 75% of the total sugar content thereof has been converted. The amount of yeast so added is about 4–8% by weight.

The resultant yeasting composition is added to a somewhat larger batch of cooked mash and the operation described above is repeated. This operation is further repeated with progressively larger batches of mash until the yeasting composition is in an amount proportioned to the bulk cooked mash.

The fermentation is then started and is continued without the need for subsequent additions of yeast. At a predetermined stage in the fermentation of the mash, sulfites or other salts are added to the mash. Such salts are added in amounts of 20–40% by weight in terms of the sugar content of the mash.

After the mash has been fermented, the yeast is permitted to settle to the bottom of the fermenter and is then removed for reuse. Glycerol, alcohol, etc., may now be fractionally distilled from the fermented mash in accordance with procedures known in the art. Newly cooked mash batches can be refermented with the yeast recovered from the previously fermented mash batch. Alternatively, the fermented mash may be distilled to remove alcohol and acetaldehyde, leaving the glycerol content with the mash. Such glycerol containing mash may be further refermented with yeasting compositions as described above and thereby increase the glycerol content thereof. This operation may be repeated to maximize the glycerol content of the last batch which is then subjected to distillation to effect the recovery of the glycerol. Furthermore, the glycerol is recovered from the mash by means of vacuum operations.

The sulfite and other salts previously mentioned tend to separate out and suitable centrifugal or filter procedures may be used to completely separate such salts.

While sulfuric acid has been used in the novel yeasting procedure as described above to complement the lactic acid, other acids may be used in lieu of the sulfuric acid, such as hydrochloric and phosphoric acids.

It has been found that the dual acid system described in preparing the yeast mash allows two strains of microorganisms to become acclimatized and compatible with each other. During the fermentation of the bulk mash by such yeasting composition, the action of the two strains of microorganisms may be said to be successive whereby the fermentation process is carried out to completion without the necessity for further additions of yeast. Furthermore, it has been found that such dual acid system when used in preparing the yeasting composition results in substantial increases in the proportion of glycerol produced and available for recovery by distillation. The desired proportions of glycerol, alcohol and acetaldehyde ultimately recovered from the fermented mash may be regulated and adjusted by selection of the grain to be fermented and by suitable variation of the dual acid relationships in the yeasting composition.

As various changes might be made in the embodiment of the invention herein disclosed without departing from the spirit thereof it is understood that all matter herein described shall be deemed illustrative and not limiting except as set forth in the appended claims.

What is claimed is:

1. The method of increasing the glycerol yield from fermented starch containing materials, comprising fermenting said starch containing materials in the presence of lactic acid and sulfuric acid acclimatized yeasts, said mixture of yeasts also containing a mixture of naturally derived lactic acid, and sulfuric acid, said lactic acid having a concentration of from 0.6 N to 0.9 N, said sulfuric acid having a concentration of from 0.3 N to 0.7 N and the total concentrations of the combined acids being from 0.9 N to 1.6 N.

2. The method of increasing the glycerol yield obtained from a fermented sugar containing mash comprising fermenting said mash in the presence of a mixture of lactic acid and sulfuric acid acclimatized yeasts containing lactic acid of a concentration of from 0.6 N to 0.9 N and sulfuric acid of a concentration of from 0.3 N to 0.7 N, the total concentration of said acids being from 0.9 N to 1.6 N, distilling alcohol and acetaldehyde from said fermented mash and refermenting the residual mash containing glycerol with additional quantities of said yeast composition to further increase the glycerol content of said refermented mash and recovering the glycerol from said refermented mash.

References Cited in the file of this patent
UNITED STATES PATENTS

| 1,990,908 | Krug et al., | Feb. 12, 1935 |
| 2,430,170 | Grover | Nov. 4, 1947 |

OTHER REFERENCES

Prescott et al.: Industrial Microbiology, Second edition, pages 299 to 307 (1949).